(No Model.)  9 Sheets—Sheet 1.

M. JENSEN.
CAN BODY MAKING MACHINE.

No. 442,484.  Patented Dec. 9, 1890.

WITNESSES:

INVENTOR:
M. Jensen
BY Munn & Co.
ATTORNEYS.

(No Model.) 9 Sheets—Sheet 2.

M. JENSEN.
CAN BODY MAKING MACHINE.

No. 442,484. Patented Dec. 9, 1890.

Fig. 2.

WITNESSES:
W. R. Davis.
C. Sedgwick.

INVENTOR:
M. Jensen
BY Munn & Co.
ATTORNEYS.

(No Model.)

M. JENSEN.
CAN BODY MAKING MACHINE.

No. 442,484. Patented Dec. 9, 1890.

Fig. 3.

WITNESSES
W. R. Davis
C. Sedgwick

INVENTOR:
M. Jensen
BY Munn & Co.
ATTORNEYS.

(No Model.) 9 Sheets—Sheet 4.

M. JENSEN.
CAN BODY MAKING MACHINE.

No. 442,484. Patented Dec. 9, 1890.

WITNESSES:
W. R. Davis
C. Sedgwick

INVENTOR:
M. Jensen
BY
Munn & Co.
ATTORNEYS.

(No Model.) 9 Sheets—Sheet 5.

M. JENSEN.
CAN BODY MAKING MACHINE.

No. 442,484. Patented Dec. 9, 1890.

WITNESSES:
W. R. Davis
C. Sedgwick

INVENTOR:
M. Jensen
BY
Munn & Co
ATTORNEYS.

(No Model.) 9 Sheets—Sheet 6.

M. JENSEN.
CAN BODY MAKING MACHINE.

No. 442,484. Patented Dec. 9, 1890.

WITNESSES:

INVENTOR:
M. Jensen
BY
Munn & Co.
ATTORNEYS.

(No Model.) 9 Sheets—Sheet 7.

M. JENSEN.
CAN BODY MAKING MACHINE.

No. 442,484. Patented Dec. 9, 1890.

WITNESSES:
N. R. Davis
C. Sedgwick

INVENTOR:
M. Jensen
BY
Munn &Co
ATTORNEYS.

(No Model.) 9 Sheets—Sheet 8.

M. JENSEN.
CAN BODY MAKING MACHINE.

No. 442,484. Patented Dec. 9, 1890.

WITNESSES:

INVENTOR:
M. Jensen
BY Munn &Co.
ATTORNEYS (No Model.) 9 Sheets—Sheet 9.
M. JENSEN.
CAN BODY MAKING MACHINE.

No. 442,484. Patented Dec. 9, 1890.

WITNESSES:
W. R. Davis.
C. Sedgwick

INVENTOR:
M. Jensen
BY Munn & Co.
ATTORNEYS

UNITED STATES PATENT OFFICE.

MATHIAS JENSEN, OF ASTORIA, OREGON, ASSIGNOR OF ONE-HALF TO THE JENSEN CAN FILLING MACHINE COMPANY, OF SAME PLACE.

CAN-BODY-MAKING MACHINE.

SPECIFICATION forming part of Letters Patent No. 442,484, dated December 9, 1890.

Application filed November 20, 1889. Serial No. 331,011. (No model.)

*To all whom it may concern:*

Be it known that I, MATHIAS JENSEN, of Astoria, in the county of Clatsop and State of Oregon, have invented a new and Improved Machine for Forming Sheet-Metal Can-Bodies, of which the following is a full, clear, and exact description.

The object of the invention is to provide a new and improved machine for forming sheet-metal can-bodies, and which is simple and durable in construction, not liable to get out of order, and does not require the attention of a skilled workman, thereby reducing the cost of producing can-bodies very materially.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

The improved machine for forming sheet-metal can-bodies is provided with a main frame A, of any approved construction, and having a base A', on which is mounted to turn the end of the main driving-shaft C, extending transversely and mounted to turn in suitable bearings on the base A'. On the outer end of the said shaft C is secured a driving-pulley C', connected with other machinery for imparting a rotary motion to the said shaft C and thereby to the longitudinally-extending shaft B.

Near one end of the shaft B is secured a grooved cam-wheel D, engaged in its cam-groove by a friction-roller D', held on an upwardly-extending lever $D^2$, pivoted at its lower end on a shaft $D^3$, mounted to turn in suitable bearings on the base A' of the main frame A. The upper end of the lever $D^2$ is pivotally connected with a link $D^4$, pivotally connected with the carrier E, serving to feed the sheet-metal blank outward and to form the hooks on the ends of the said sheet-metal blank. The carrier E is provided on each side with a runner E', mounted to slide in suitable guideways formed in a plate $A^2$, supported on the base A' and being part of the main frame A. When the main shaft B is rotated, the cam-wheel D imparts an oscillating motion to the lever $D^2$, and the latter by its connection with the carrier imparts a reciprocating motion to said carrier.

Figure 3:
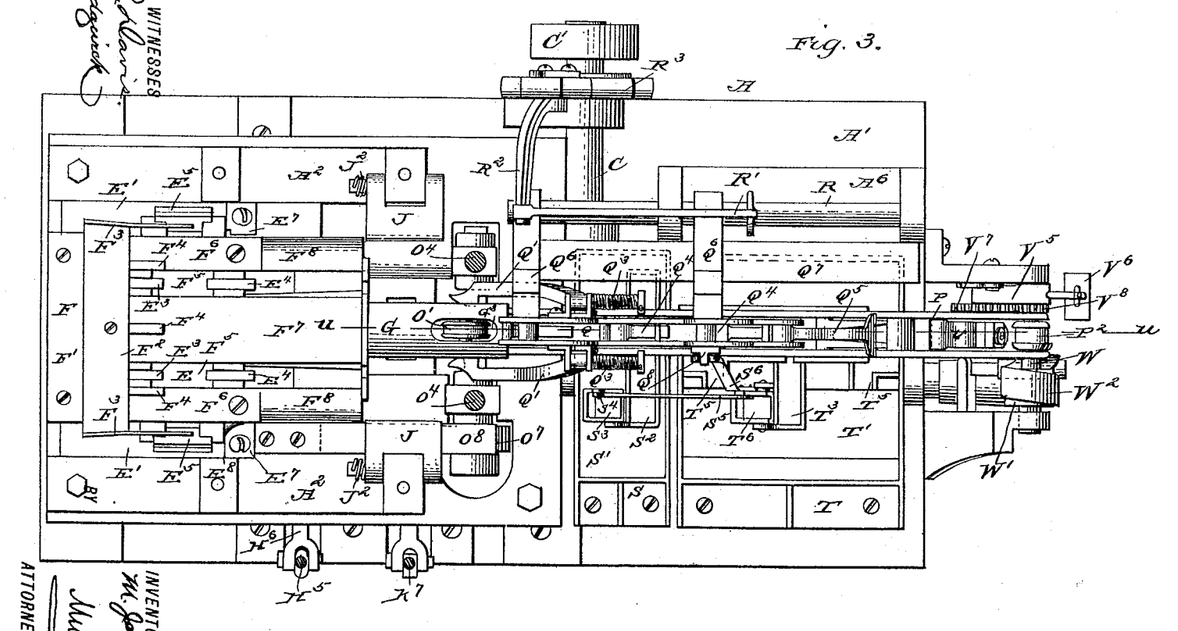
Fig. 3 is a plan view of the same with parts removed.
Figure 4:
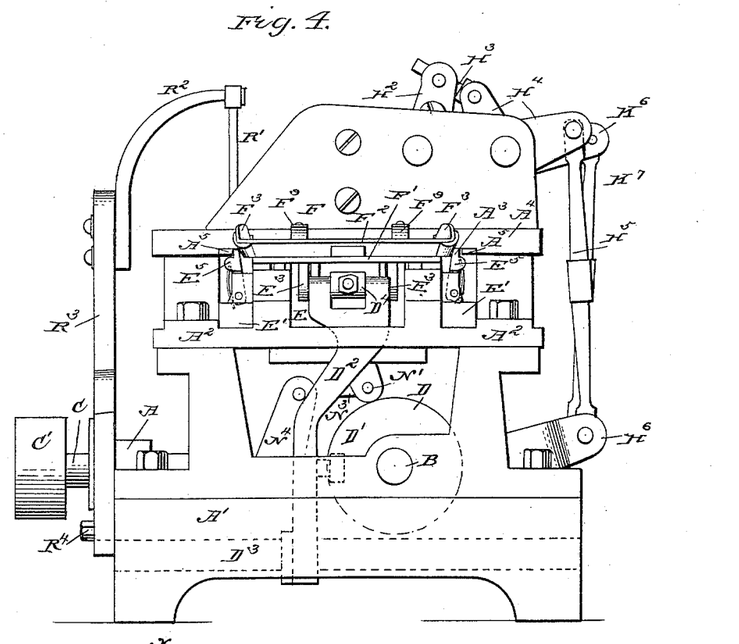
Fig. 4 is an end view of the same.

Above the carrier E is arranged a feed-table F, supported on the plate $A^2$ of the main frame A. The feed-table F is provided with a plate F', on which is held an upwardly and outwardly inclined transversely-extending bar $F^2$, provided on its sides with flanges $F^3$, and serving to support a number of sheet-metal blanks from which the can-body is to be formed. The lower ends of the sheet-metal blanks are adapted to rest on wedges F$^4$, held on the plate F′ between the longitudinally-extending slots F$^5$, formed in the said plate by the side pieces F$^6$ and the middle part F$^7$ of the said plate F′. The front ends of the side plates or pieces F$^6$ are curved at F$^8$, as is plainly shown in Figs. 3 and 10, thus forming dies over which the sheet-metal blank is pressed to give it the first curve, as is shown in Fig. 19.

Figure 7:
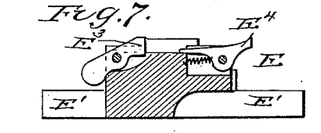
Fig. 7 is a longitudinal section of the same on the line $y\ y$ of Fig. 5.

In the slots F$^5$ of the feed-table plate F′ are held to travel sets of dogs E$^3$ and E$^4$, arranged one in front of the other and serving to feed the sheet-metal blank forward, as hereinafter more fully described. The dogs E$^3$ are preferably gravity-dogs, as shown in Fig. 7, while the other set of dogs E$^4$ is held in an uppermost position by a spring, which permits the swinging motion of the dog when on the return-stroke.

Figure 11:
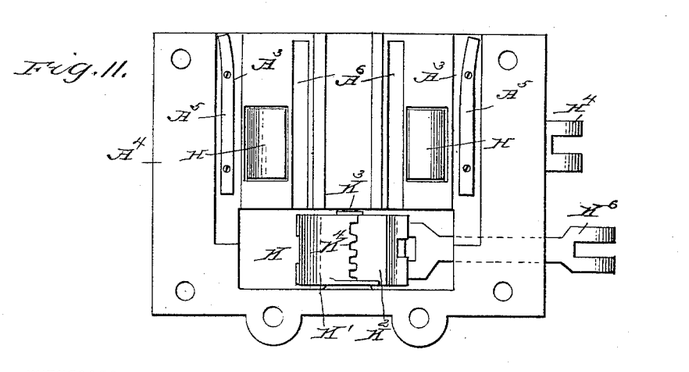
Fig. 11 is an inverted plan view of the fixed table on which the hooks of the blank are formed.

The sheet-metal blank is fed from the bar F$^2$ forward over the wedges F$^4$ until the outer edge rests against the backs of the wedges F$^4$, being held in place by springs F$^9$, held on the main frame. When the reciprocating carrier on which the dogs E$^3$ and E$^4$ are mounted is in its rearmost position, the set of dogs E$^3$ engages the rear edge of the sheet-metal blank and moves it forward over the table F′ when the carrier E is on its forward stroke. The blank, which had been resting on the curved part F$^8$ of the side plates F$^6$, is moved over the feed-table F′ by the set of dogs E$^4$ on the forward stroke of the carrier, so that the sheet-metal blank is moved onto the horn G, extending longitudinally from the inner end of the feed-table F. The carrier E is also provided on each side with a spring-pressed arm E$^5$, extending upward and provided on its upper end with a tongue E$^6$, engaging a longitudinally-extending groove A$^3$, arranged in the under side of a plate A$^4$, supported above the plate A$^2$, previously mentioned. (See Fig. 11.) In the groove A$^3$ is arranged a rail A$^5$ in such a manner that when the guide-arms E$^5$ are in their outermost position they are opened outward by their spring, and when the carrier E moves forward, as the guide-rails A$^5$ incline toward each other, they press the guide-arms E$^5$ inward against the ends of the sheet-metal blank carried forward on the feed-table F′ by the dogs E$^3$, as previously described. In front of the guide-arms E$^5$ on the carrier E are rigidly secured folding-blocks E$^7$, inclined upward, and each provided at its upper edge with a groove E$^8$, fitting under the lower outer edge of the side plates F$^6$ of the feed-table F′, so that when the sheet-metal blank is resting on the front curved ends F$^8$ of the side plates F$^6$ the said folding-blocks turn over the ends of the blanks, as plainly shown in Fig. 20.

Figure 10:
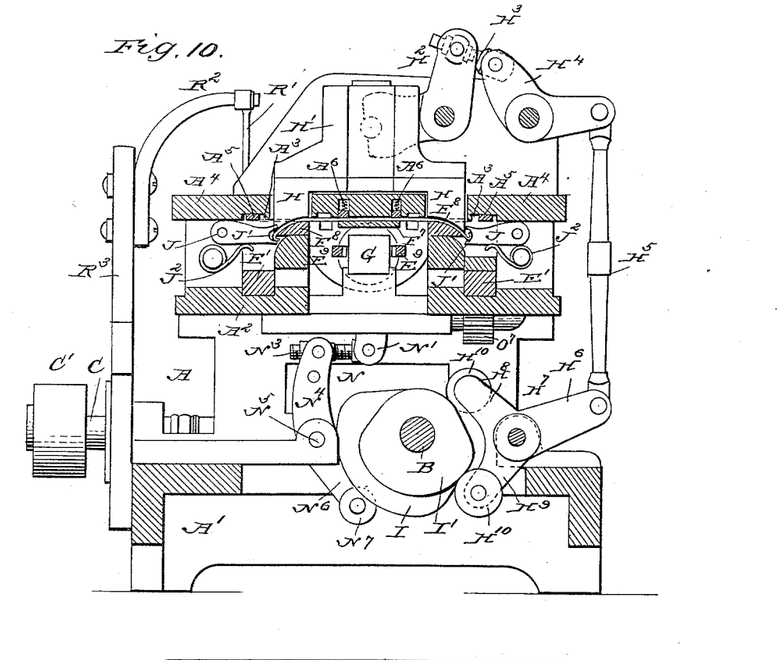
Fig. 10 is a transverse section of the improvement on the line $w\ w$ of Fig. 1.
Figures 15, 16, 17, 19, 20:
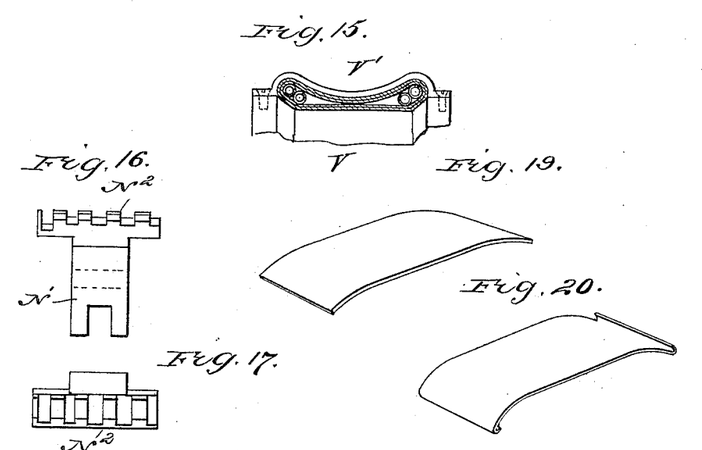
Fig. 15 is a transverse section of part of the same.
Fig. 16 is a side elevation of an arm of the seam-pressing device.
Fig. 17 is a plan view of the same.
Fig. 19 is a perspective view of the sheet-metal blank after the first operation.
Fig. 20 is a like view of the same after the second operation.

One of the folding-blocks E$^7$ has its groove E$^8$ arranged relative to the edge of the side plates F$^6$ in such a manner that the corresponding end of the blank is turned upward, while the other folding-block E$^7$ is arranged to turn the respective end of the sheet-metal blank inward, as shown in Figs. 10 and 20. The sheet-metal blank is held in place while passing over the feed-plate F′ by spring-pressed bars A$^6$, mounted in the under side of the plate A$^4$ of the main frame A. (See Figs. 10 and 11.)

Directly over the curved ends F$^8$ of the side plates F$^6$ are arranged the curved dies H, adapted to press the sheet-metal blank onto the curved parts F$^8$, as is plainly shown in Fig. 10, whereby the parts of the ends of the sheet-metal blank are bent, as shown. The dies H are mounted to slide in suitable bearings in the plate A$^4$ of the frame A and are secured on top to a head H′, pivotally connected with one arm of a bell-crank lever H$^2$, fulcrumed in standards erected on the plate A$^4$ and pivotally connected by a link H$^3$ with one end of a bell-crank lever H$^4$, also fulcrumed on the said standard on the top plate A$^4$, and having its outer arm connected by a link H$^5$ with one arm H$^6$ of a three-armed lever H$^7$, provided with the other two arms H$^8$ and H$^9$, each carrying a friction-roller H$^{10}$, engaging the cams I and I′, respectively, secured on the longitudinal shaft B, and arranged in such a manner as to impart a vertical reciprocating motion to the moving dies H at the proper time, as hereinafter more fully described.

Figure 8:
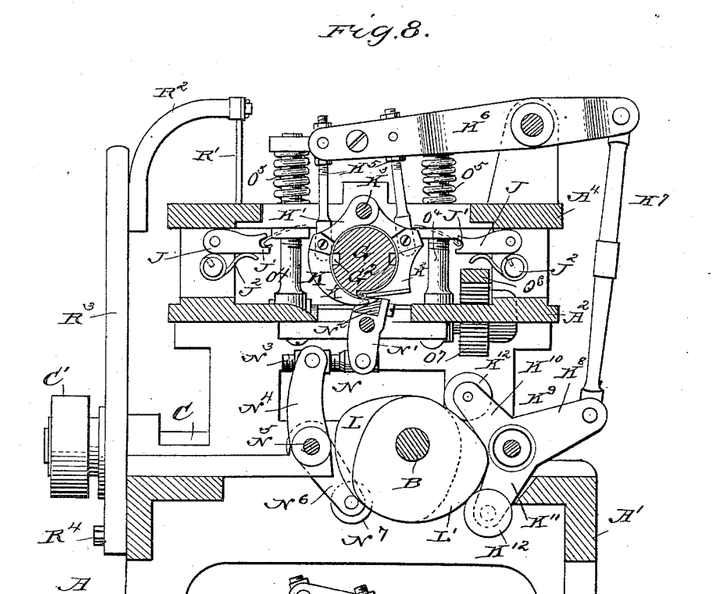
Fig. 8 is a transverse section of the improvement on the line $z\ z$ of Fig. 1.
Figure 9:
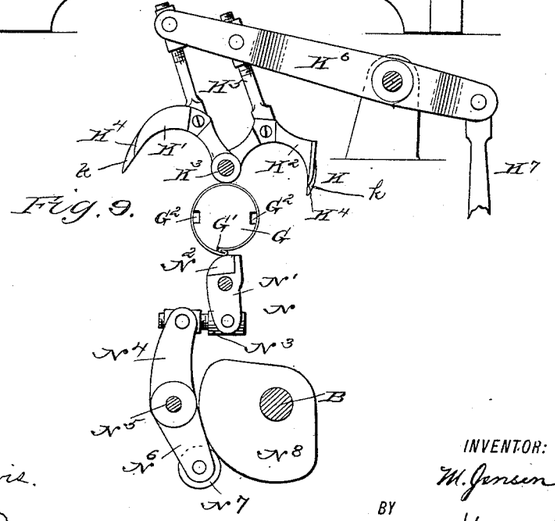
Fig. 9 is a sectional view of the bending and locking mechanism for the sheet-metal blank.
Figures 18, 21:
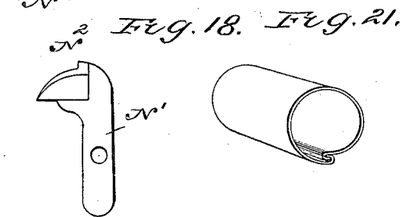
Fig. 18 is an end view of the same.
Fig. 21 is a similar view of the same after the third operation.
Figure 22:
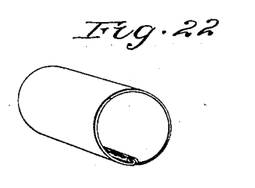
Fig. 22 is a like view of the finished can-body.
Figures 23, 24:
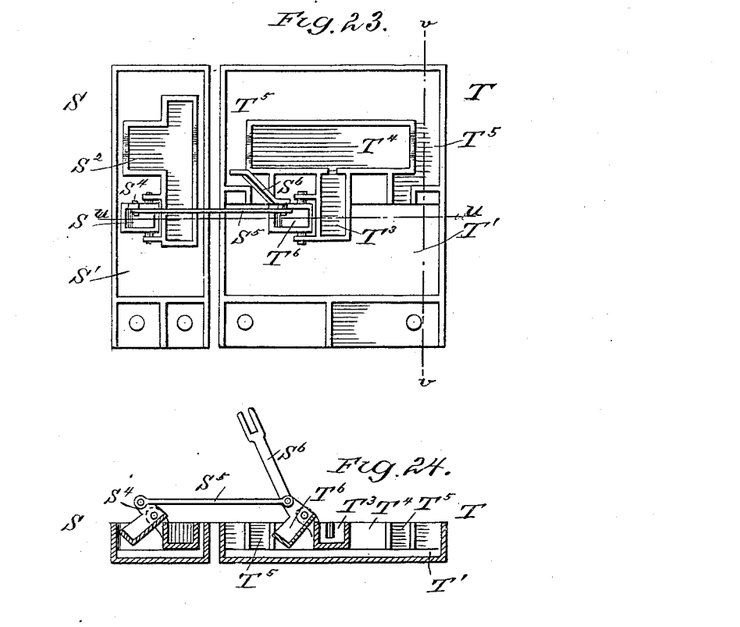
Fig. 23 is a plan of the solder reservoir, tank, and dipper.
Fig. 24 is a longitudinal vertical section on line $u\ u$, Fig. 23.
Figure 25:
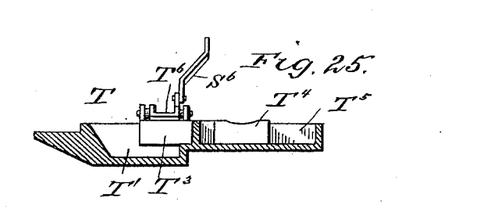
Fig. 25 is a transverse section on line $v\ v$, Fig. 23.

After the blank has been operated on by the male moving dies H it is pushed forward by the dogs E$^4$ of the reciprocating carrier E, and is pushed onto the keepers J, pivoted on the main frame A, below the plate A$^4$, and each provided with a recess J′, into which pass the hooks or lips of the blank, as is plainly shown in Figs. 8 and 10. Each of the keepers J is held in position by a spring J$^2$, which permits a yielding motion of the keeper J when the blank is operated on by the bending mechanism K, consisting of a pair of tongs. The latter is provided with two semicircular prongs K′ and K$^2$, pivoted at K$^3$ in the plate A$^4$, and each provided with series of teeth K$^4$ at their outer ends. The prongs K′ and K$^2$ are adapted to press the blank out of contact with the keepers J and to press it around the horn G until the lips, folds, or hooks on the blank pass each other or register, in the manner hereinafter more fully described. The prongs K′ and K$^2$ are pivotally connected by the links K$^5$ with a lever K$^6$, extending transversely and mounted to turn on a suitable pivot formed on the top plate A$^4$. The outer end of the lever K$^6$ is pivotally connected by a link K$^7$ with one arm K$^8$ of a three-armed lever K$^9$, fulcrumed on the base A′ of the frame A. The three-armed lever K$^9$ is also provided with the two arms K$^{10}$ and K$^{11}$, each of which carries a friction-roller K$^{12}$, traveling on the peripheries of the cams L and L′, respectively secured on the longitudinal shaft B next to the cams I and I′, previously mentioned. When the shaft B is set in motion, the cams L and L' act on the three-armed lever K$^9$, so that the latter oscillates the lever K$^6$, which by the links K$^5$ opens and closes the prongs K' and K$^2$ for bending the sheet-metal blank onto the horn G. After the prongs have performed their work the lip or hook interlocking mechanism N, located below the horn G, acts on the hooks or lips formed on the sheet-metal blank on the under side of the horn G, so as lock the lips in place in the groove G', extending longitudinally on the under side of the horn G. The lip or hook interlocking mechanism N is provided with a lever N', on the upper end of which is arranged a series of teeth N$^2$, adapted to fit between the teeth K$^4$ of the prong K' when the latter is closed and to engage the lips of the blank, as is plainly shown in Fig. 9. (See also Figs. 16, 17, and 18.) The lower end of the lever N' is pivotally connected by a link N$^3$ with an arm N$^4$, secured on a short shaft N$^5$, extending longitudinally and mounted to turn in suitable bearings on the base A' of the main frame to one side of the main shaft B. (See Fig. 9.) On the shaft N$^5$ is secured downwardly-extending arm N$^6$, carrying a friction-roller N$^7$, traveling on the periphery of a cam N$^8$, secured on the longitudinal shaft.

Figure 5:
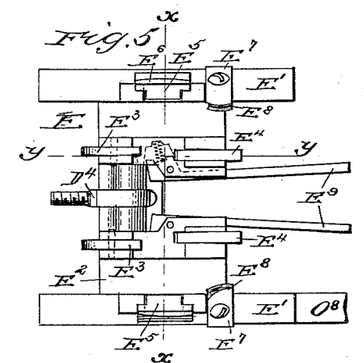
Fig. 5 is a plan view of the reciprocating carrier for feeding the sheet-metal blank and forming the hooks thereon.
Figure 6:
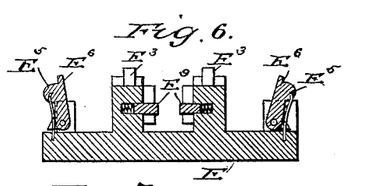
Fig. 6 is a transverse section of the same on the line $x\ x$ of Fig. 5.

A spring N$^9$ serves to hold the friction-roller N$^7$ onto the cam N$^8$, so that when the latter turns, the shaft N$^5$ is rocked, thus imparting a swinging motion to the arm N$^4$, which by its link N$^3$ oscillates the lever N', so that the teeth N$^2$ of the latter press against the outer or lower hook or lip inward, while the bending-tongs are closed, so as to prevent the hooks from passing or striking each other when the tongs open. The shoulder shown in Fig. 18 serves to interlock the hooks or lips after the tongs have released its hold. The lips or hooks now interlocked lie along the groove G' and are ready for the seaming-rollers. When this has been accomplished, the blank is pushed forward on the horn G by means of spring-pressed pivoted arms E$^9$, pivoted on the carrier E, as is plainly shown in Figs. 5 and 6, said arms extending into longitudinal grooves G$^2$, formed in the sides of the horn G. When the carrier E moves rearward, the outer free ends of the arms E$^9$ are pressed outward, so as to engage the rear edge of the circular sheet-metal blank, and when the carrier is on its forward stroke said arms E$^9$ push the blank to the front end of the horn G and through the seam-pressing mechanism O, provided with a grooved roller O', mounted to turn in a recess G$^3$, formed vertically in the front end of the horn G.

The lower edge of the roller O' projects slightly below the horn G, and the seam in passing over the said roller O' is pressed by a second roller O$^2$, held below the roller O' and traveling on the outside of the seam. The roller O$^2$ is secured on the shaft O$^3$, mounted to turn in suitable bearings formed in the yielding posts O$^4$, extending upward through the frame-plate A$^4$, and each provided with a collar adapted to rest on the under side of the plate A$^4$. A spring O$^5$ is coiled on each of the posts O$^4$ and rests with one end on the top plate A$^4$, while its other end presses against the nut O$^6$, screwed on the upper end of the respective post O$^4$. By adjusting the nut O$^6$ the tension of the spring O$^5$ may be increased or diminished, so that the roller O$^2$ is pressed with more or less force against the outside of the seam.

On one outer end of the shaft O$^3$ is secured a pinion O$^7$, meshing into a rack O$^8$, secured on one of the sides E' of the carrier E, so that when the latter is reciprocated the rack O$^8$ travels with it and imparts a forward-and-backward rotary motion to the shaft O$^3$, carrying the roller O$^2$. The latter travels forward with the forward motion of the carrier E—that is, at the same time that the arm E$^9$ of the said carrier pushes the sheet-metal blank from the rear end of the horn G between the rollers O$^2$ and O', so that the seam is evenly pressed throughout its length.

Figures 12, 13:
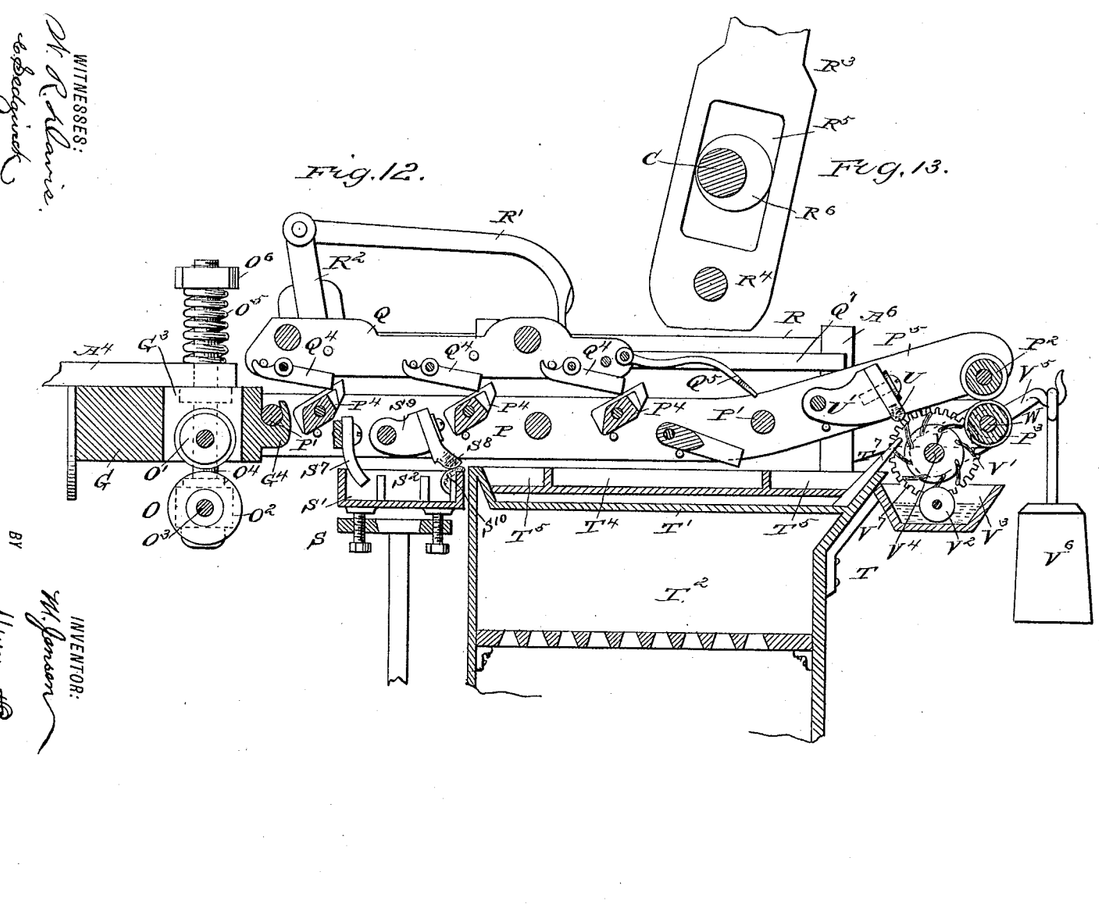
Fig. 12 is an enlarged sectional side elevation of the soldering mechanism on the line $u\ u$ of Fig. 3.
Fig. 13 is an enlarged side elevation of the lever for operating the soldering mechanism, adjacent parts being in section.

The blank after leaving the horn G and the seam-pressing mechanism O passes onto a frame P, extending longitudinally in line with the horn, and is bent upward at its outer end, as is plainly shown in Fig. 12. The frame P is provided with two side plates, connected with each other by transverse pins P', one of which, next to the horn G, is hooked onto a hook G$^4$, formed on the end of the horn G, thus permitting the frame P to swing up or down. The outer end of the frame P is provided with a roller P$^2$, which is adapted to rest on a roller P$^3$, mounted to turn in suitable bearings on the outer ends of brackets A$^6$, held on the base A'.

The blank is moved from the end of the horn G onto the frame P by two hooks Q', adapted to travel in the longitudinal grooves G$^2$ in the said horn G and engaging the inner edge of the sheet-metal blank, so as to pull the latter off of the horn G onto the frame P when the said hooks Q' move outward. Each of the hooks Q' is secured on a shaft Q$^2$, mounted to turn in suitable bearings on a dog-carrying frame Q, held above the frame P and having a reciprocating motion. In order to make the hooks Q' yielding, the shafts Q$^2$ are pressed by a torsion-spring Q$^3$, which serves to press the hooks Q' inward, at the same time permitting a slight outward-swinging motion, so as to travel over the sheet-metal blank when the reciprocating frame Q is on its inward stroke. In the frame Q are arranged a series of gravity-dogs Q$^4$, (see Fig. 12,) operating in conjunction with gravity-pawls P$^4$, held in the frame P. The dogs Q$^4$ serve to move the sheet-metal blank forward on the frame P in order to solder the same by the soldering mechanism, hereinafter more fully described.

Figure 2:
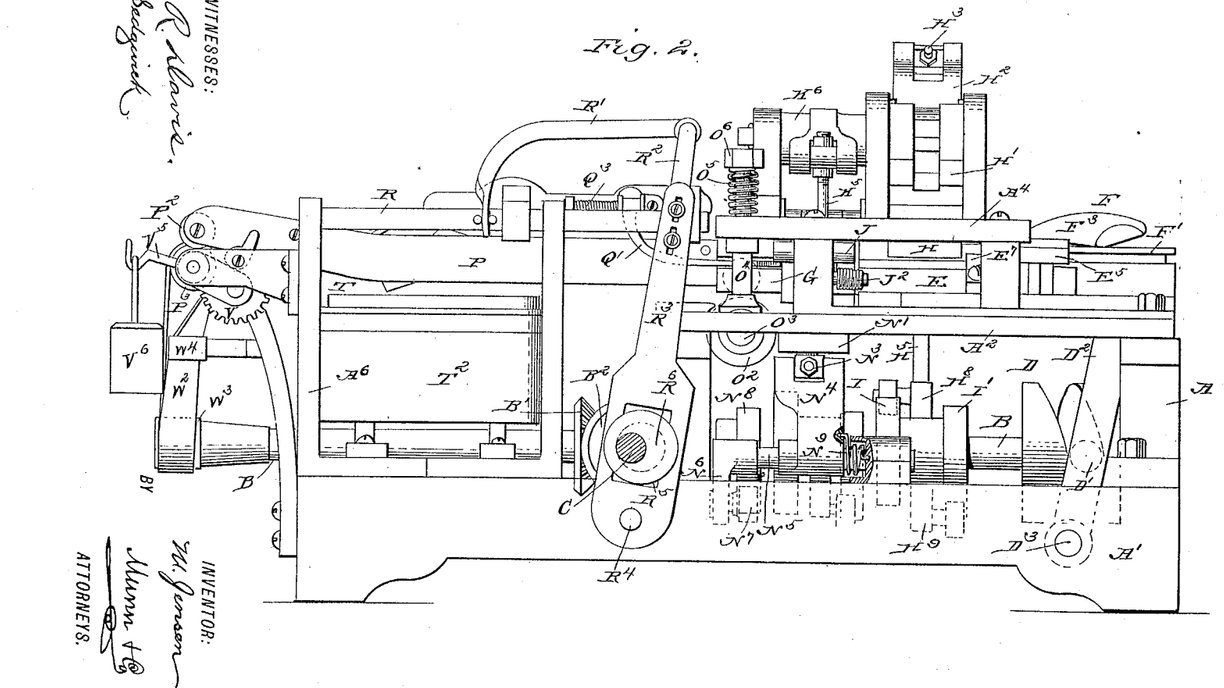
Fig. 2 is a rear side elevation of the same.

On the outer end of the frame Q is a long dog Q$^5$, resting with its free end on the top of the side plates of the frame P and serving to push the finished can-body onto and over the inclined part $P^5$ of the frame P. The frame Q is provided with transversely-extending arms $Q^6$, supporting a longitudinally-extending bar $Q^7$, mounted to slide in suitable bearings on the bracket $A^6$, previously mentioned. The transversely-extending arms $Q^6$ are also secured on a shaft R, mounted to slide in suitable bearings on the bracket $A^6$ and pivotally connected by a link $R'$ with an arm $R^2$, held vertically adjustable on a lever $R^3$, fulcrumed at its lower end at $R^4$ on the base $A'$. In the lever $R^3$ is arranged a slot $R^5$, in which operates an eccentric $R^6$, secured to the main driving-shaft C, as is plainly shown in Figs. 2 and 13. When the main driving-shaft C is rotated, the eccentric $R^6$ imparts an oscillating motion to the lever $R^3$, which, by the link $R'$, acts on the shaft R, which is thus moved forward and backward longitudinally, carrying with it the dog-carrying frame Q, so that the hooks $Q'$ engage the sheet-metal blank and push it over the end of the horn G onto the frame P, and then the sheet-metal blank is successively operated on at each full stroke of the frame Q by its dogs $Q^4$, so as to move the sheet-metal blank forward on the frame P. The backward movement of the sheet-metal blank on the frame P is prevented by the gravity-pawls $P^4$, held on the said frame.

Under the hinged frame P is arranged a fluxing mechanism S and the soldering mechanism T. The fluxing mechanism S is located next to the horn G and is provided with a reservoir $S'$, open at the top and containing the acid. A second smaller reservoir $S^2$ is formed within the reservoir $S'$ and is filled with acid from the reservoir $S'$ by means of a pivoted ladle $S^3$, adapted to dip into the acid in the reservoir $S'$ and to discharge into the smaller reservoir $S^2$. In order to accomplish this, the ladle $S^3$ is provided with an arm $S^4$, pivotally connected by a link $S^5$ with a lever $S^6$, having its free end forked and engaged by a pin $Q^8$, projecting from the reciprocating frame Q. When the latter is set in motion, as previously described, the lever $S^6$ is rocked and imparts a similar motion to the ladle $S^3$, so that the acid from the reservoir $S'$ is transferred into the reservoir $S^2$, whereby the latter is kept filled and the can-body, with its seam downward, comes in contact with the acid in passing over the said reservoir $S^2$.

Figure 1:
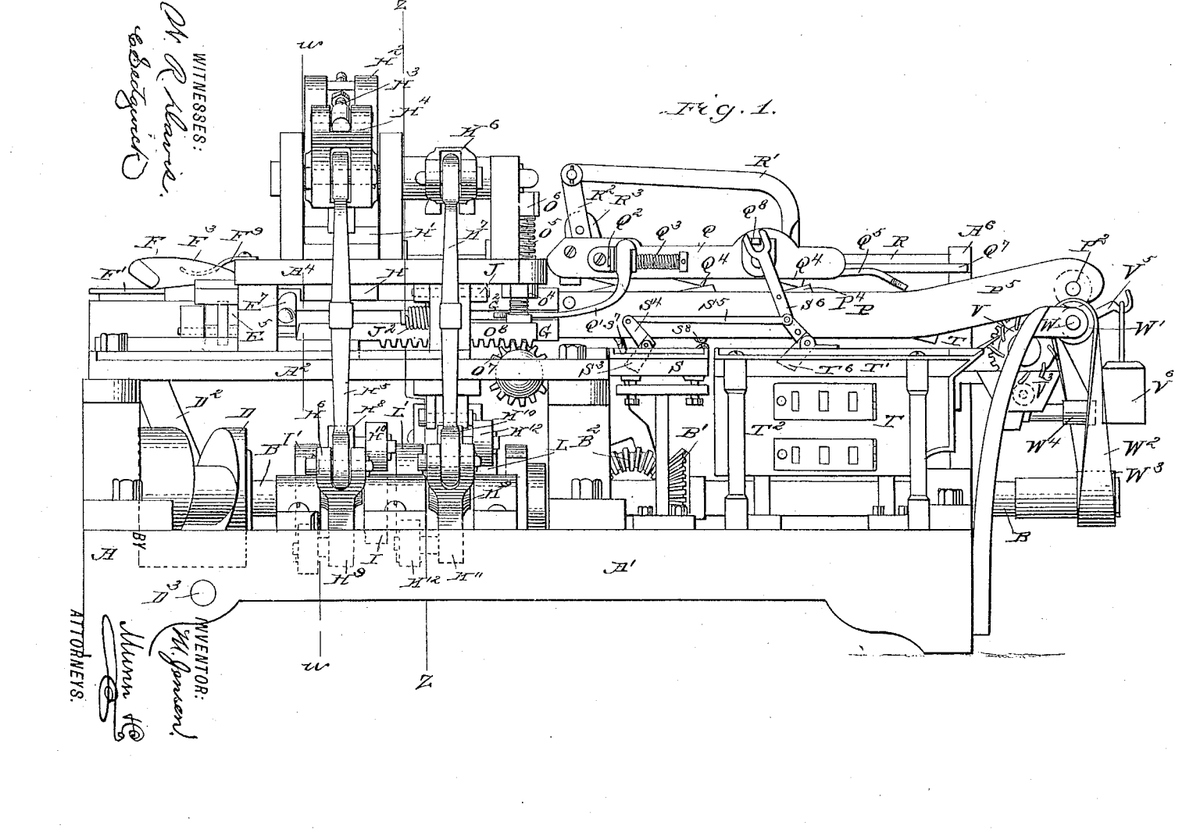
Figure 1 is a front side elevation of the improvement.

In order to place acid on the inside of the seam, a piece of cloth $S^7$ is secured between the sides of the frame P, said piece of cloth extending into the reservoir $S'$, so as to absorb acid, and when the can-body is pushed over the frame P and the reservoir $S'$ the cloth $S^7$ passes over the inside of the seam, thus moistening the same. The surplus acid is wiped off on the inside by the piece of cloth $S^8$, secured on an arm $S^9$, pivoted between the sides of the frame P and held in contact with the same by the bend of the arm $S^9$. The surplus acid is wiped off of the outside of the seam by a fixed piece of cloth $S^{10}$, secured on the outer side of the reservoir $S'$ directly below the piece of cloth $S^8$. (See Fig. 12.) The reservoir $S'$ is preferably vertically adjustable on suitable brackets erected on the base $A'$, as shown in Figs. 1 and 12.

The soldering device T, located next to the fluxing device S, is provided with a reservoir $T'$, containing solder, which is kept in a molten state by heat from a furnace $T^2$ of any approved construction and located directly under the reservoir $T'$. In the reservoir $T'$ is held a channel $T^3$, extending transversely and discharging into a longitudinal tank $T^4$, located directly under the frame P and filled with molten solder, so that the can-body in passing over the frame P is exposed to the molten solder at its seam. The surplus solder from the tank $T^4$ passes into the transversely-extending channels $T^5$, discharging into the reservoir $T'$, as the channel $T^3$, the tank $T^4$, and the channels $T^5$ are slightly raised above the bottom of the reservoir $T'$. The molten solder from the latter is transferred into the channel $T^3$ by means of a pivoted ladle $T^6$, connected with the lever $S^6$, previously mentioned, and which operates the ladle $S^3$ of the fluxing device S. Both ladles $S^3$ and $T^6$ are operated simultaneously through the reciprocation of the frame Q, so that the tank $T^4$ is constantly supplied with molten solder.

Figure 14:
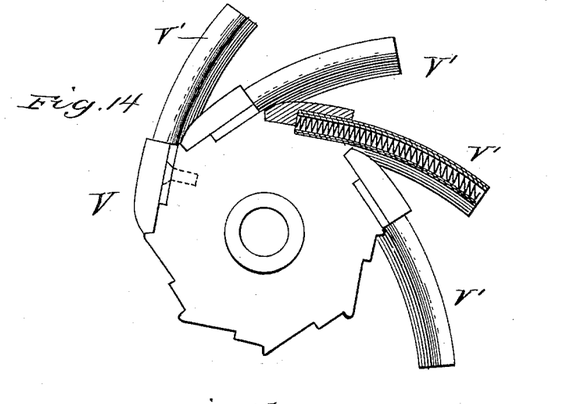
Fig. 14 is an enlarged side elevation, with parts in section, of the wiping-brush.

From the end of the longitudinally-extending tank $T^4$ extends upward the rear part $P^5$ of the frame P, so that the can-body after leaving the solder travels up the said inclined part $P^5$ to be wiped on the inside of its seam by a wiper U, made of cloth or other suitable material, secured on the end of an arm $U'$, pivoted between the sides of the frame P, as is plainly shown in Fig. 12. The outside of the seam of the can-body is wiped by a wiping-brush V, provided with a series of bristles $V'$, formed of cloth held stiff by spiral springs, (see Figs. 14 and 15,) and adapted to engage the outside of the seam and kept moistened with water by a wheel $V^2$ in contact with the said bristles $V'$ and revolving in a tank $V^3$ filled with water.

As the can-body travels up the incline $T^5$, it is held in an inclined position, so that the solder runs down into the reservoir $T'$. The solder which may adhere to the bristles $V'$ is removed by a fixed bar $T^7$, secured at one end of the reservoir $T'$ and held in contact with the said bristles.

The wiping-brush V is secured on a shaft $V^4$, mounted to turn in suitable bearings formed in an arm $V^5$, fulcrumed on a shaft W, which carries the wheel $P^3$, previously mentioned. On the outer end of the arm $V^5$ is suspended a weight $V^6$, which serves to move the wiping-brush V upward in contact with the seam of the can-body to be wiped. Suitable means may be employed to limit the swinging motion of the arm $V^5$. The shaft W is rotated from the longitudinal shaft B by providing said shaft W with a pulley $W'$, over which passes a crossed belt W², also passing over a pulley W³, secured on the said longitudinal shaft B. The crossed belt W² also passes over a friction-roller W⁴, turning on a stud projecting from the bracket A⁶ and serving to guide the belt to the pulleys W' and W³.

The operation is as follows: When the main driving-shaft C is rotated, it imparts a rotary motion to the longitudinal shaft B, which, by the several cams and levers, &c., imparts motion at the proper time to the several mechanisms above described. The blanks from which the can-bodies are to be made are placed in a bunch on the transverse bar F² on the feed-table F, and one after another of the said blanks is fed onto the dogs E³ of the carrier E to be moved forward and to be acted on by the several mechanisms. When the blank is placed on the plate F', in front of the dogs E³, then the carrier on its forward stroke moves the blank along, and when the blank has passed the side flanges F³ its ends are engaged by the spring-pressed arms E⁵, guided in the grooves A³ by the rails A⁵ and serving to carry the blank centrally to the female dies or curved parts F⁸. As soon as the blank has arrived over the rounded dies F⁸ the male dies H are moved downward by the action of the cams I and I', so that the ends are slightly curved, (see Fig. 19,) and at the same time the blank is held in place to be acted on by the folding-blocks E⁷, which now move rearward on the backward stroke of the carrier E and engage with their grooves the ends of the blank and press the same against the lower edges of the dies F⁸ in such a manner that one of the edges is folded inward and the other is bent upward, thus forming two lips on the blank, as shown in Fig. 20. The dies F⁸ and H curve the blank to a smaller radius than the can-body to be made, so that the latter is made slightly oblong, with the seam on the longest diametrical line, so that the spring element in the can-body will finally cause the seam thereon to press hard against the flange on its head to insure good soldering of the head to the body, even of the most difficult part—namely, the seam of the body to the can-head. The folding-blocks E⁷ have their ends curved and formed so that they will turn over the ends of the blanks and form the lip thereon by simply being drawn over the ends of the said blank which are pressed against the edges of the fixed dies F⁸. When the carriage E moves rearward, the second set of dogs E⁴ passes to the rear of the blank over the dies F⁸, so that on the next forward movement of the carrier the blank is engaged by the said dogs E⁴ and moved forward over the table F onto the arms J, the lips of the blank resting in the grooves J', formed on the said arms. The blank now rests with its middle part over the inner end of the horn G, and the blank is now pressed over the said horn by the closing of the prongs K' and K² of the bending mechanism K, operated from the shaft by the cams L and L'. The periphery of the horn G is in the form of a volute, which forms on the bottom the recess G', into which the seam is guided while being compressed by the seam-forming mechanism N, actuated by the cam N⁸. The prongs K² are made to fit the smaller half of the horn G with a thickness of tin between the two. The other prong K' fits the larger half of the horn G, and when the two prongs close the lips (see Fig. 21) previously bent on the blank are in position to engage each other, as is plainly shown in Fig. 9, after which the lever N' is oscillated so as to press the lower lip or hook, thus interlocking the ends of the can-body. The teeth K⁴ of the prongs K' and K² are made to pass each other, and each prong has a somewhat longer tooth $k$ at its end to prevent the sheet-metal blank from being moved too far on the horn G previous to bending the same. The teeth N² of the lever N' when engaging the lips first bear on the outer end of the tin and then move it sufficiently to prevent the inner hook from passing out of the other hook when the tongs are opened. As soon as the prongs K' and K² open, the arms E⁹ are moved farther toward the front end of the horn G, thus pushing the interlocking can-body onto the front end of the horn between the rollers O' and O², so that the interlocking lips are pressed firmly together by the said rollers. After the seam is pressed by the rollers the can-body is engaged at its rear end by the hooks Q', which move with the frame Q and draw the can-body onto the frame P, so that the inside of the same is covered with acid by the cloth S⁷, while the exterior of the same receives the acid from the tank S². At the next forward movement of the reciprocating frame Q the first dog Q⁴ pushes the can-body to the next station, so that the same is wiped on the inside and the outside by the cloths S⁷ and S¹⁰, whereby the surplus acid is wiped back into the reservoir S'. The next set of dogs Q⁴ and P⁴ at the next forward movement of the reciprocating frame Q moves the can-body to the solder in the tank T⁴, whereby the interlocked lips are soldered both inside and outside. The next set of dogs Q⁴ and P⁴ moves the can-body up onto the incline P⁵ of the frame P, so that the inside and outside of the soldered seam are wiped by the cloth U and the revolving wiping-brush V. The last dog Q⁵ on the reciprocating frame Q pushes the finished can-body between the rollers P² and P³ over the machine.

It is understood that the frame P is made horizontal from the horn Q to the end of the tank T⁴, so that the can-bodies are moved on the frame with the seam accurately and perpendicularly underneath, in order to apply it to the acid and the solder with as little contact as possible, so as to save both, as well as to apply all seams alike to the interior wipers U and S⁸, both of which will wear to fit the interior projecting seam, and thus wear themselves to a proper form for clean working.

It is understood that the acid is held in such a position that it can be touched by the seam of the can-body when moving over it on the frame P, the acid being held at the same level regardless of the supply in the reservoir S' as long as there is sufficient supply for the ladle S³ to dip. The solder in the reservoir T' and tank T⁴ is arranged in a manner similar to the acid in the reservoir S'. It is understood that the circulation of the solder caused by the dipping of the ladle T⁶ keeps the solder at an even heat in all parts of the reservoir T'.

Thus it will be seen that at the first station a hook is made on each end of the blank by the folding-blocks E⁷ being drawn over the same, and at the second station it is curved over a form with one grip of a pair of tongs and the hooks or lips are united, and while moving between the second and third stations the hooks are compressed together by being forced between two wheels, and, with the seam perpendicularly underneath, the body is continued forward with the seam just touching a running stream of acid, is then wiped and then treated to a stream of molten solder, and again wiped and finally passed over the end of the frame T, ready for heading.

Having thus described my invention, what I claim as new, and desire to secure by Letters Patent, is—

1. In a machine of the character described, the combination, with a clamp for holding the blank, of a longitudinally-reciprocating edge-turning block or folder to travel along the edge of the blank and fold or turn it, substantially as set forth.

2. The combination, with a clamp for holding the blank, of two opposite longitudinally-reciprocating edge-turning blocks or folders to travel along opposite edges of the blank and fold or bend said edges, respectively, over upon opposite sides of the blank to simultaneously form the interlocking hooks at a single stroke, substantially as set forth.

3. The combination, with the frame having fixed longitudinal guideways and a horizontal longitudinally-slotted table above said ways, of a reciprocating carrier under the table on said ways and having dogs projecting up through the slots in the table, opposite yielding arms on the carrier to clamp the blank, and opposite edge-folders, also on the carrier, substantially as set forth.

4. In a can-body-forming machine, the combination, with a fixed table, of a reciprocating carrier provided with dogs for feeding the sheet-metal blanks forward on the said table, and yielding arms pivoted on the said carrier and adapted to engage the ends of the blank to guide the latter forward, substantially as shown and described.

5. In a can-body-forming machine, the combination, with fixed rounded dies, of movable dies reciprocating over the said fixed dies to partly bend and to clamp the blank, and folding-blocks mounted to reciprocate longitudinally and having grooved ends adapted to engage and move along the ends of the blank and press the same over the edges of the fixed dies, substantially as shown and described.

6. In a can-body-forming machine, the combination, with a reciprocating carrier provided with dogs adapted to feed the sheet-metal blank forward, of spring-pressed pivoted arms provided with grooves in their free ends to receive the lips of the sheet-metal blank, substantially as shown and described.

7. In a can-body-forming machine, the combination, with pivoted arms supported on springs and supporting the sheet-metal blank, of a pair of bending-tongs adapted to engage the sheet-metal blank to bend the same and to disengage the lips from the said pivoted arms, substantially as shown and described.

8. In a can-body-forming machine, the combination, with pivoted arms supported on springs and supporting the sheet-metal blank, of a pair of bending-tongs adapted to engage the sheet-metal blank to bend the same and to disengage the lips from the said pivoted arms, and a fixed horn in line with the said arms and pair of tongs, and over which the sheet-metal blank is bent, substantially as shown and described.

9. In a machine of the character described, the combination, with a horn having a longitudinally-extending shoulder along one side, of a bending-tongs adapted to close around the horn and having the free ends of its members constructed to overlap at said shoulder, the end of the overlapped member being adapted to press a previously-folded edge of the can-body against said shoulder and the end of the outer or overlapping member projecting across the shoulder to force the opposite folded edge past the first-named edge, and an interlocking mechanism at the shouldered side of the horn to engage the folded edges of the body, hold them when released by the tongs, and interlock them, substantially as set forth.

10. In a machine of the character described, the combination, with the horn in the form of a volute, the groove and shoulder formed thereby extending along the lower side of the horn, of a bending-tongs above the horn and adapted to embrace the same to bend a previously folded or lipped blank therearound and bring the folded ends into position for interlocking, and a transversely-movable lever below the shoulder to force the lower or outer folded end of the blank inwardly into the fold of the opposite end, the inner fold being supported by said shoulder, substantially as set forth.

11. The combination, with the horn and the bending-tongs to bend the blank around the horn to bring its previously-folded ends into position, the free ends of the tongs being provided with overlapping toothed prongs, of a lever reciprocating transversely under the said horn and having its upper end provided with teeth to pass between the teeth of said prongs and interlock the said folded ends of the blank, substantially as set forth.

12. The combination, with the horn, of bending-tongs to bend the blank around the horn to bring its folded ends into position, the free ends of the tongs having prongs or stops to limit the movement of the blank along the horn previous to bending, substantially as set forth.

13. The combination, with the horn and the bending tongs to bend the blank around the horn and bring its previously-folded ends into position, the free ends of the tongs being provided with overlapping prongs having teeth, of the transversely-swinging interlocking lever having its upper end rounded, toothed, and shouldered to pass between the prong-teeth and engage the lower or outer folded end of the can and interlock it with the other folded edge, substantially as set forth.

14. In a can-body-forming machine, the combination, with a horn supporting the sheet-metal can-body, of a roller mounted to turn in the said horn and projecting below the same, a second roller in line with the said first-named roller, and a reciprocating carrier for turning the said second roller and sliding the can-body over the said horn, its seam passing between the said rollers, substantially as shown and described.

15. In a can-body-forming machine, the combination, with a horn supporting the sheet-metal can-body, of a roller mounted to turn in the said horn and projecting below the same, a second roller in line with the said first-named roller, a reciprocating carrier for turning the said second roller and sliding the can-body over the said horn, its seam passing between the said rollers, and yielding bearings for the said second roller, substantially as shown and described.

16. In a can-body-forming machine, the combination, with a horn, of a carrier-frame hinged on the end of the said horn and adapted to receive the can-bodies directly from the said horn, substantially as shown and described.

17. In a can-body-forming machine, the combination, with a horn, of a carrier-frame hinged on the end of the said horn and adapted to receive the can-bodies directly from the said horn, and a reciprocating frame provided with yielding hooks for moving the can-bodies from the said horn onto the said hooked frame, substantially as shown and described.

18. In a can-body-forming machine, the combination, with a can-body-carrying frame constructed to receive the can-bodies upon and around it, of a reciprocating frame held over the said carrying-frame and provided with dogs to move the can-body forward on the said carrying-frame, substantially as shown and described.

19. In a can-body-forming machine, the combination, with a can-body-carrying frame upon and around which the can-bodies may be passed, of a reciprocating frame held over the said carrying-frame and provided with dogs to move the can-body forward on the said carrying-frame, and dogs held on the said carrying-frame to engage the interior of the can-bodies to prevent a backward movement thereof, substantially as shown and described.

20. In a can-body-forming mechanism, a fluxing device comprising a reservoir, an elevated tank, and an oscillating ladle for transferring the acid from the said reservoir to the said tank, substantially as shown and described.

21. In a can-body-forming machine, the combination, with a horn, a can-body-carrying frame secured to one end of the horn and onto and around which the can-bodies pass from the horn, and a mechanism for moving the can-body along the said frame, of a fluxing device held below the said frame and provided with an acid-tank through which passes the seam of the can-body, substantially as shown and described.

22. In a can-body-forming machine, the combination, with a can-body-carrying frame and a mechanism for moving the can-body along the said frame, of a fluxing device held below the said frame and provided with an acid-tank through which passes the seam of the can-body and a moistener held in the said frame and adapted to pass over the inside of the seam and hung into the said tank, substantially as shown and described.

23. In a can-body-forming machine, the combination, with a can-body-carrying frame and a mechanism for moving the can-body along the said frame, of a fluxing device held below the said frame and provided with an acid-tank through which passes the seam of the can-body, a moistener held in the said frame and adapted to pass over the inside of the seam and hung into the said tank, and an inside wiper hung on the said frame to remove the surplus acid from the inside of the seam, substantially as shown and described.

24. In a can-body-forming machine, the combination, with a can-body-carrying frame to receive the cans upon and around it directly from the horn and having an inside moistener and wiper and a mechanism for moving the can-body along the said frame, of a fluxing device held below the said frame and provided with an acid-tank through which passes the seam of the can-body and a fixed wiper held on the said tank under the inside wiper to wipe the outside of the seam of acid after leaving the tank, substantially as shown and described.

25. In a can-body-forming machine, the combination, with a can-body-carrying frame and a mechanism for moving the can-bodies on the said frame, of a soldering-reservoir held below the said frame and provided with a tank containing molten solder, through which passes the seam of the can-body, the upper end of the tank having a supplying mechanism connected with the tank and the lower end of the tank discharging into the reservoir, whereby the solder will flow through the interior of the can along its seam as the can is fed along the frame, substantially as shown and described.

26. In a can-body-forming machine, the combination, with a straight longitudinally-extending can-body-carrying frame, a horn from which the can-bodies are discharged upon the said frame, and a mechanism for moving the can-bodies on the said frame, of a soldering-reservoir held below the said frame and provided with a tank containing molten solder, through which passes the seam of the can-body, and means, substantially as described, for automatically filling the said tank with molten solder at its upper or outer end, the lower end of the tank discharging the surplus solder back into the reservoir and delivering the flow of solder into the can-body along its seam, substantially as shown and described.

27. In a can-body-forming machine, the combination, with a straight longitudinally-extending can-body-carrying frame provided with an upwardly-inclined end, a horn from which the can-bodies are discharged upon and around said frame, and a mechanism for moving the can-bodies over the said end, of a soldering device having a tank under the main or straight part of the frame and a reservoir held below the said frame near the said end to permit the surplus solder on the can-bodies held on the inclined end to flow back into the said reservoir, substantially as shown and described.

28. In a can-body-forming machine, the combination, with a horn, a can-body-carrying frame connected to the horn and receiving the can-bodies upon and around it directly from the horn, and a mechanism for moving the can-bodies on the said frame, of a wiper comprising an arm pivoted in the said frame and a cloth secured on the free end of the said arm and adapted to engage the inside of the seam of the can-body, substantially as shown and described.

29. In a can-body-forming machine, the combination, with a horn, a can-body-carrying frame pivoted to the end thereof to receive the can-bodies upon and around it, and a mechanism for moving the can-bodies over the said frame, of a transversely-extending wiping-brush mounted to revolve below and across the delivery end of the said frame and adapted to engage the exterior of the can-body seam, substantially as shown and described.

30. In a can-body-forming machine, the combination, with a can-body-carrying frame and a mechanism for moving the can-bodies over the said frame, of a wiping-brush mounted to revolve below the said frame and adapted to engage the exterior of the can-body seam, and a weighted arm carrying said brush to press the latter into contact with the seam, substantially as shown and described.

31. In a can-body-forming machine, the combination, with a can-body-carrying frame and a mechanism for moving the can-bodies over the said frame, of a wiping-brush mounted to revolve below the said frame and adapted to engage the exterior of the can-body seam, a weighted arm carrying said brush to press the latter into contact with the seam, and means, substantially as described, for imparting a rotary motion to the said brush, as set forth.

32. In a can-body-forming machine, the combination, with a horn and a can-body-carrying frame hinged thereto to receive the can-bodies upon and around it, provided with a grooved roller in its outer end to engage the interior of the bodies, of a second roller in frictional contact with the said first-named roller, substantially as shown and described.

33. In a can-body-forming machine, the combination, with a horn and a can-body-carrying frame hinged thereto to receive the can-bodies upon and around it, provided with a grooved roller in its outer end to engage the interior of the bodies, of a second roller in frictional contact with the said first-named roller and means for imparting motion to the said second roller, substantially as shown and described.

34. In a can-body-forming machine, a feed-table comprising a slotted plate, an inclined transverse bar for supporting the sheet-metal blanks, and wedges held in the said plate in front of the said bar, substantially as shown and described.

35. In a can-body-forming machine, a feed-table comprising a slotted plate, an inclined transverse bar for supporting the sheet-metal blanks, wedges held in the said plate in front of the said bar, and a spring for holding the sheet-metal blanks in place, substantially as shown and described.

36. In a can-body-forming machine, the combination, with fixed rounded female dies and concave male dies adapted to operate over the said female dies and a reciprocating head carrying the said male dies, of a carrier to present the blanks to said dies in its forward movement and provided at opposite sides with folders or lip-forming blocks to engage the ends of the blank in the rearward movement of the carrier, substantially as shown and described.

37. In a can-body-forming machine, the combination, with a fixed plate having guide-ways, of a reciprocating carrier and upwardly-porjecting arms pvioted on the said carrier at opposite sides of the center to move toward each other and engage the end edges of the blank and engaging the said guideways, substantially as shown and described.

38. In a can-body-forming machine, the combination, with a fixed plate having guideways in its lower face, of a reciprocating carrier under said plate, arms pivoted on the said carrier at opposite sides of its center to swing toward each other and engage the end edges of the can-blank and engaging the said guideways with their upper ends, and springs pressing on the said pivoted arms to open them, substantially as shown and described.

39. In a can-body-forming machine, the combination, with a fixed longitudinally-slotted plate, of a fixed table held below the said plate, a blank-receiving space being formed between the two, and a reciprocating carrier sliding under the said fixed table and provided with pivoted dogs projecting up through the slots into the said space to move the blank sheet along the said table under the said plate, substantially as shown and described.

40. In a can-body-forming machine, the combination, with a fixed longitudinally-slotted plate, of a fixed table held below the said plate, a blank-receiving space being formed between the two, a reciprocating carrier sliding under the said fixed table and provided with pivoted dogs projecting up through the slots into the said space to move the blank sheet along the said table under the said plate, and bars mounted yieldingly in the lower face of said plate to press the blank sheet onto the fixed table, substantially as shown and described.

41. The combination, with the horn in the form of a volute and having a vertical central longitudinal recess intersecting the longitudinal shoulder and groove formed by the two diameters, and a seaming-roller mounted in said recess and projecting therethrough into the longitudinal groove, of a yielding seaming-roller mounted in the vertical plane of and adjacent to said horn roller, substantially as set forth.

42. The combination, with the horn and the bending-tongs to bend the blanks around the horn to bring their previously folded or hooked edges into position, of an interlocking mechanism under the horn to interlock the said hooked or folded edges, seaming-rollers in advance of the said tongs, and interlocking mechanism to press the interlocked seams into permanent union, substantially as set forth.

43. The combination, with a feed-table, stationary dies at the forward end thereof, a horn in advance of the said dies, and a vertically-reciprocating head having dies corresponding to the first-named dies, of a bending-tongs over the horn to bend the blanks therearound, a carrier provided with dogs, one in advance of the other, to successively feed the blank in its forward stroke between the dies, then to the horn, and then along the horn, and opposite folders or edge-turning blocks in the carrier to act in connection with the lower outer edges of said stationary dies and fold the end edges of the blank on the rearward stroke of the carrier, substantially as set forth.

44. The combination, with the feed-table, the stationary dies at the forward end thereof, the horn in front of the dies, blank-holders above the horn, a reciprocating die over the stationary dies, and a bending-tongs over the horn and above the blank-holders to force the blank therefrom and around the horn, of a carrier having dogs to successively feed the blank between the dies, then to the holders over the horn, and then along the horn, and folders or edge-bending blocks on the carrier to act on the back-stroke of the carrier upon the end edges of the blank and bend them prior to the delivery of the blank to the holders over the horn, and an interlocking mechanism under the horn to interlock said folded or hooked edges, substantially as set forth.

45. The combination, with the feed-table, the clamping and bending dies at the front end thereof, a horn in front of said dies, a carrier-frame secured to the front end of the horn in longitudinal alignment therewith, blank-bending tongs over the horn, a seam-interlocker under the horn, and seam-pressing rollers at the forward end of the horn, of a carrier having dogs to successively present the blank between the said dies, then to the horn, and then force them along the horn to the seaming-dies, folders or bending-blocks on the carrier and acting on its rear stroke to fold the end edges of the blank while held by the said dies, and mechanism for feeding the now seamed bodies from the horn to the carrier-frame, substantially as set forth.

46. The combination, with the feed-table, the dies at the front end thereof, the longitudinally-grooved horn, and the bending and seam-interlocking mechanisms operating in connection therewith, of a carrier having edge-folders or bending-blocks acting on the back-stroke thereof, as described, dogs on the carrier to feed the blank to the dies and then to the horn, and laterally-swinging arms or dogs pivoted to the front end of the carrier and projecting in front thereof to enter the grooves in the horn and adapted to push the can-body along the horn, substantially as set forth.

47. The combination, with the longitudinally-grooved horn having a longitudinally-aligned can-carrier secured to its forward end to receive the can-bodies upon and around it from the horn, and the seam-forming mechanism, of a blank-carrier having dogs to feed the blank to the horn, and laterally-swinging dogs or arms projecting in front of the carrier to enter the grooves in the horn and adapted to feed the can-body along the horn, a reciprocating frame above the said can-carrier and provided with swinging hooked arms at its rear end to enter the horn-grooves behind the can-body and remove said body from the horn to the can-carrier, and dogs on said reciprocating frame, one in advance of the other, to feed the can-body successively, and the fluxing and soldering mechanism below the can-carrier to which the can-bodies are presented by said dogs, substantially as set forth.

MATHIAS JENSEN.

Witnesses:
C. W. FULTON,
H. JACKSON.